US007010415B2

(12) United States Patent
Dölker

(10) Patent No.: US 7,010,415 B2
(45) Date of Patent: Mar. 7, 2006

(54) METHOD FOR CONTROLLING AN INTERNAL COMBUSTION ENGINE

(75) Inventor: Armin Dölker, Immenstaad (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 10/496,584

(22) PCT Filed: Nov. 20, 2002

(86) PCT No.: PCT/EP02/12971

§ 371 (c)(1),
(2), (4) Date: May 24, 2004

(87) PCT Pub. No.: WO03/046357

PCT Pub. Date: Jun. 5, 2003

(65) Prior Publication Data

US 2004/0249555 A1 Dec. 9, 2004

(30) Foreign Application Priority Data

Nov. 24, 2001 (DE) ................................ 101 57 641

(51) Int. Cl.
*B60T 7/12* (2006.01)

(52) U.S. Cl. ........................ 701/107; 123/456; 123/457

(58) Field of Classification Search ................ 701/107; 123/456, 457, 458, 506, 514
See application file for complete search history.

(56) References Cited

U.S. PATENT DOCUMENTS

| | | | | |
|---|---|---|---|---|
| 5,937,826 | A | 8/1999 | Olson et al. | 123/447 |
| 6,053,147 | A | 4/2000 | Hemmerlein et al. | 123/447 |
| 6,578,553 | B1 | 6/2003 | Schubert et al. | 123/458 |
| 2003/0154806 | A1 | 8/2003 | Rueger | 73/865.9 |

FOREIGN PATENT DOCUMENTS

| | | | |
|---|---|---|---|
| DE | 19731201 | A1 | 1/1999 |
| DE | 19916100 | A1 | 10/2000 |
| DE | 10003298 | A1 | 8/2001 |
| DE | 10014737 | A1 | 10/2001 |
| EP | 0899442 | A2 | 3/1999 |

OTHER PUBLICATIONS

International Search Report.

*Primary Examiner*—Tony M. Argenbright
*Assistant Examiner*—Johnny H. Hoang
(74) *Attorney, Agent, or Firm*—Crowell & Moring LLP

(57) ABSTRACT

A common rail injection system for an internal combustion engine, wherein upon detection of a defective rail sensor system the transition from the normal operation to the emergency operation is determined reliably by means of a transition function. The transition function is determined beforehand from the characteristics of a system deviation as a function of time during normal operation. In so doing, the system deviation is calculated from a variance comparison of the rail pressure. The result of this defect transition process is a more noise-proof and more continuous transition from the normal operation to the emergency operation.

29 Claims, 6 Drawing Sheets

METHOD FOR CONTROLLING AN INTERNAL COMBUSTION ENGINE

This application claims the priority of German patent document 101 57 641.2, filed 24 Nov. 2001 (PCT International Patent Application No. PCT/EP02/12971, filed 20 Nov. 2002), the disclosure of which is expressly incorporated by reference herein.

BACKGROUND AND SUMMARY OF THE INVENTION

The invention relates to a process for controlling an internal combustion engine with a common rail injection system.

In a common rail injection system the rail pressure is regulated. The actual value of the rail pressure, thus the controlled variable, is gathered by an electronic controller by way of a rail pressure sensor. Said controller calculates the system deviation from a variance comparison of the rail pressure and determines by way of a rail pressure regulator a select signal for a setting element, for example, a suction throttle or a pressure regulating valve. Since the rail pressure represents a significant parameter for the injection quality, one must react to a defective rail pressure sensor with appropriate measures. The DE 199 16 100 A1 proposes in the case of a defective rail pressure sensor that one changes from normal operation to a start operation. In the start operation the rail pressure is controlled. In so doing, a high pressure pump is set to the maximum pump delivery rate; and a pressure regulating valve, which determines the outflow from the rail, is closed. The with this solution is the abrupt transition from the normal to the start operation, as well as the resulting high rail pressure.

The U.S. Pat. No. 5,937,826 discloses an emergency operation (limp home) for an internal combustion engine with a defective rail pressure sensor. In the emergency operation the high pressure pump is controlled by way of a characteristic diagram as a function of the engine speed and a desired rate of injection. The problem with this solution is that immediately after the transition into the emergency operation the rail pressure can increase due to the previous large system deviation. Thus, the engine speed can increase. This undefined operating state remains until the engine speed regulator reduces the desired rate of injection and controls the rail pressure indirectly by way of the characteristic diagram.

Therefore, the invention is based on the problem of making the transition from the normal operation to the emergency operation safer.

The problem is solved by a process for controlling an internal combustion engine during which a rail pressure is regulated in normal operation, and upon detection of a defective rail pressure sensor the normal operation is switched to an emergency operation the rail pressure is controlled in accordance with a transition function which smoothly and reliably transitions rail pressure control from the normal operation to the emergency operation. Related embodiments are discussed further, below.

The invention provides that the transition from the normal operation to the emergency operation is determined reliably by a transition function. In normal operation this transition function is determined beforehand from the characteristics of the system deviation of the rail pressure as a function of time. In addition, the system deviations in one measurement period or a specifiable number of system deviations can be considered. As one measure, at the end of the normal operation the transition function defines a negative system deviation for the rail pressure regulator in accordance with the measurement period, logged during the normal operation, or the number of system deviations. An alternative measure provides that a correcting volumetric flow of the controlled system is specified by means of the transition function. The correcting volumetric flow is calculated from the difference between two system deviations. Both measures offer the advantage that a defined, continuous transition from the normal operation to the emergency operation takes place. The result of the direct impact of the transition function on the rail pressure regulator or the controlled system is a short reaction period after the rail pressure sensor fails.

At the end of the transition function a switch is made to the characteristic diagram, known from the prior art. A flanking measure provides a loading characteristic diagram, with which the values of the characteristic diagram are additionally weighted. In addition, the characteristic diagram is corrected by limit lines, whereby the indirect determination of the rail pressure is aided by the engine speed regulator.

DETAILED DESCRIPTION OF THE DRAWINGS

Figure 1:
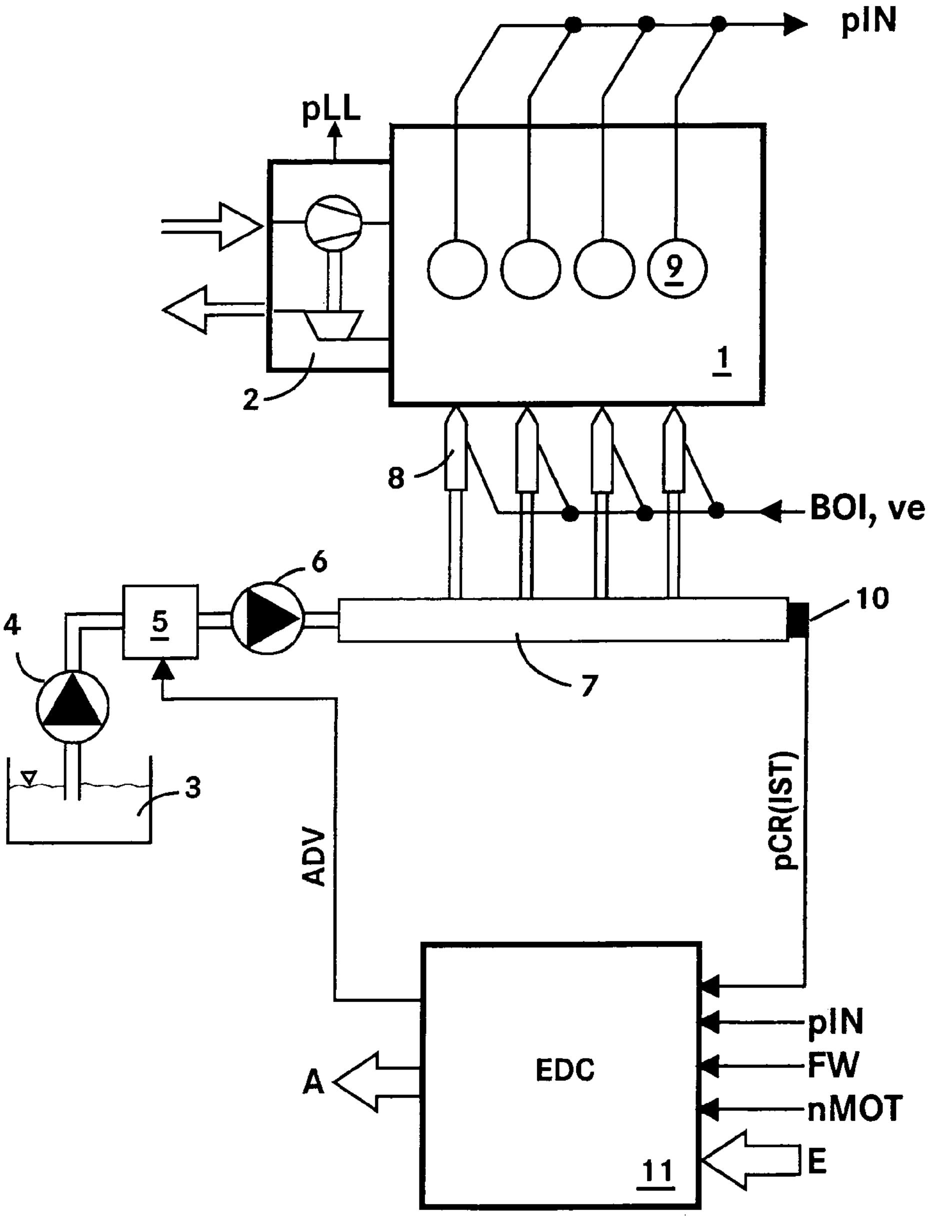
FIG. 1 is a schematic illustration of a common rail injection system in accordance with an embodiment of the present invention.

FIG. 1 depicts a block diagram of an internal combustion engine 1 with a common rail injection system. The common rail injection system comprises a first pump 4, a suction throttle 5, a second pump 6, a high pressure accumulator and injectors 8. In the text below the high pressure accumulator is referred to as the rail 7. The first pump 4 delivers the fuel from a fuel tank 3 to the suction throttle 5. The pressure level after the first pump 4 is, for example, 3 bar. The volumetric flow to the second pump 6 is determined by way of the suction throttle 5. The second pump 6 in turn delivers the fuel under high pressure into the rail 7. In diesel engines the pressure level in the rail 7 is more than 1,200 bar. The injectors 8 are connected to the rail 7. The fuel is injected by means of the injectors 8 into the combustion chambers of the internal combustion engine 1.

The internal combustion engine 1 is controlled and regulated by means of an electronic device controller 11 (ED C). The electronic device controller 11 contains the customary components of a microcomputer system, for example, a microprocessor, I/O modules, buffer and memory modules (EEPROM, RAM). The operating data in the characteristic diagrams/characteristic lines that are relevant for operating the internal combustion engine 1 are entered into the memory components. With said data the electronic device controller 11 calculates the outputs from the inputs. In FIG. 1 the following inputs are shown as an example: a rail pressure-actual value pCR(IST), which is measured by means of the rail pressure sensor 10; the speed nMOT of the internal combustion engine 1; a performance request FW; an internal cylinder pressure pIN, which is measured by means of the pressure sensors 9; and an input E. Under the input E there are subsumed, for example, the charge air pressure pLL of the turbocharger 2 and the temperatures of the coolant and lubricant. FIG. 1 shows a signal ADV, for controlling the suction throttle 5, and an output A as the outputs of the electronic device controller 11. The output A stands for the other actuating signals for controlling and regulating the internal combustion engine 1, for example, the injection start BOl and the rate of injection ve.

In practice the select signal ADV is designed as a PWM signal (pulse width modulated), by means of which a corresponding current value for the suction throttle 5 is set. When the current value is zero (i=0), the suction throttle 5 is fully opened, i.e. the volumetric flow, delivered by the first pump 4, flows unimpeded to the second pump 6.

Figure 2:
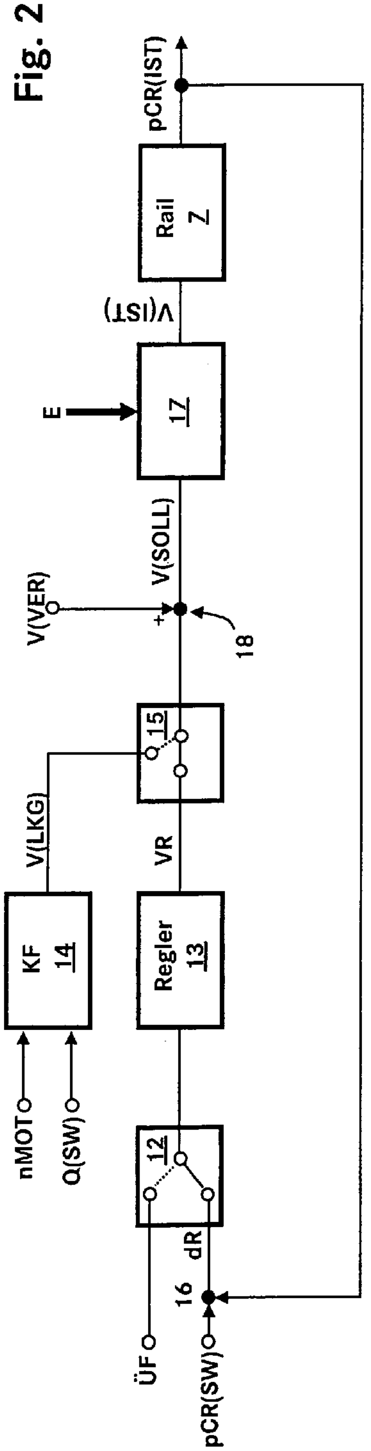
FIG. 2 is a schematic illustration of a common rail injection system control circuit in accordance with an embodiment of the present invention.

FIG. 2 shows a control circuit in a first design. It contains as the key elements a first summation point 16, a rail pressure regulator 13, a conversion 17 and the rail 7. The conversion 17 contains the conversion of the desired volumetric flow V(SOLL) into the select signal ADV, the suction throttle 5 and the second pump 6. Inputs E, for example the fuel admission pressure, the operating voltage and the engine speed, are fed to the conversion 17. The conversion 17 and the rail 7 correspond to the controlled system. This basic control circuit is supplemented with a first switch 12, a second switch 15 and a second summation point 18. FIG. 2 shows the first switch 12 and the second switch 15 in their switch position in accordance with the normal operation of the internal combustion engine (continuous line). In normal operation the rail pressure-actual value pCR(IST) at the first summation point 16 is compared, as the controlled variable, with the reference variable, the rail pressure-desired value pCR(SW), and fed as the system deviation dR to the rail pressure regulator 13. As a function of the system deviation dR, the rail pressure regulator 13 determines a regulator-volumetric flow VR. At the second summation point 18 a consumption-volumetric flow V(VER) is added to the former regulator-volumetric flow. The consumption-volumetric flow V(VER) is calculated as a function of the engine speed nMOT and a desired rate of injection Q(SW). The result of these two volumetric flows is the desired volumetric flow V(SOLL), as the manipulated variable, which represents the input for the conversion 17. By means of the conversion 17 the select signal ADV for the suction throttle 5 is generated, which then results in an actual volumetric flow V(IST) by way of the second pump 6.

Upon detection of a defective rail pressure sensor, the first switch 12 changes into the switch position, shown as a dashed line. In this switch position the system deviation is specified by means of the transition function ÜF. The transition function was determined beforehand during normal operation from the characteristics of the system deviations dR as a function of time. In practice, the system deviations in one measurement period are also considered.

As an alternative, even just a specifiable number of system deviations can be used, of course. At the end of the normal operation, the transition function ÜF defines the system deviation for the rail pressure regulator 13 according to the measurement period, logged during the normal operation. Following the passage of this time stage, the transition function ÜF ends, and the second switch 15 changes into the position, shown as a dashed line. The desired volumetric flow V(SOLL) is now calculated from the consumption-volumetric flow V(VER) and a leakage-volumetric flow V(LKG). This in turn is defined reliably by the characteristic diagram 14 as a function of the engine speed nMOT and the desired rate of injection Q(SW).

Figure 3:
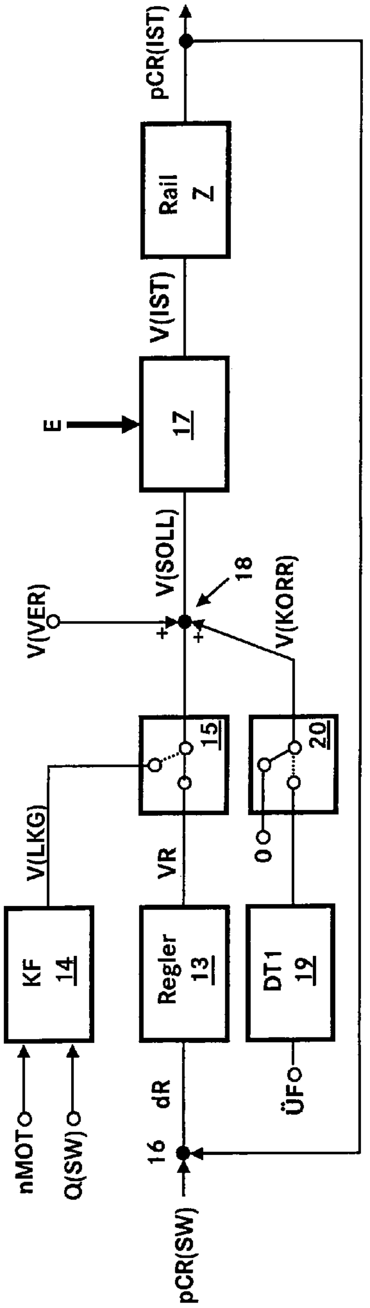
FIG. 3 is a schematic illustration of a common rail injection system control circuit in accordance with a further embodiment of the present invention.

FIG. 3 depicts the control circuit in a second embodiment. The distinction between the control circuit of FIG. 2 and that of FIG. 3 is a DT1 block 19, a third switch 20 and the omission of the first switch 12. The second switch 15 and the third switch 20 are shown for the normal operation (continuous line). The function of the control circuit in normal operation is in conformity with the description in FIG. 2. Upon detection of a defective rail pressure sensor, the second switch 15 and the third switch 20 change into the dashed position. The rail pressure regulator 13 is immediately deactivated. At this stage the desired volumetric flow V(SOLL) is computed through addition from the leakage-volumetric flow V(LKG), the consumption-volumetric flow V(VER) and the correcting volumetric flow V(KORR). The correcting volumetric flow V(KORR) is determined by means of the DT1 block 19 from the transition function ÜF. This is calculated from the difference between two system deviations in normal operation and specified to the DT1 block 19 as the negated step function. The transition function ÜF is explained in detail in connection with FIG. 4B. If the output of the DT1 block 19 falls below the threshold value or a time stage expires, the transition function is deactivated. Then the third switch 20 returns into its starting position (normal operation). In the end the desired volumetric flow V(SOLL) is defined only by the characteristic diagram 14 and the consumption-volumetric flow V(VER).

Figure 4A:
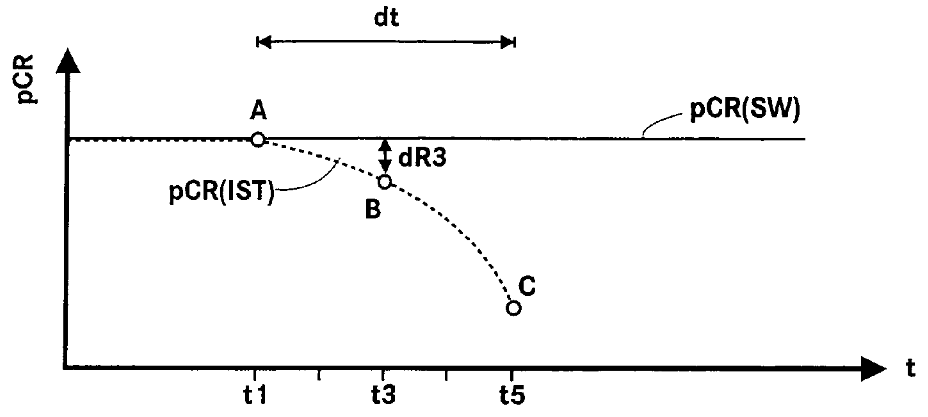
FIGS. 4A, 4B are diagrams illustrating common rail injection system operation as an system emergency develops.
Figure 4B:
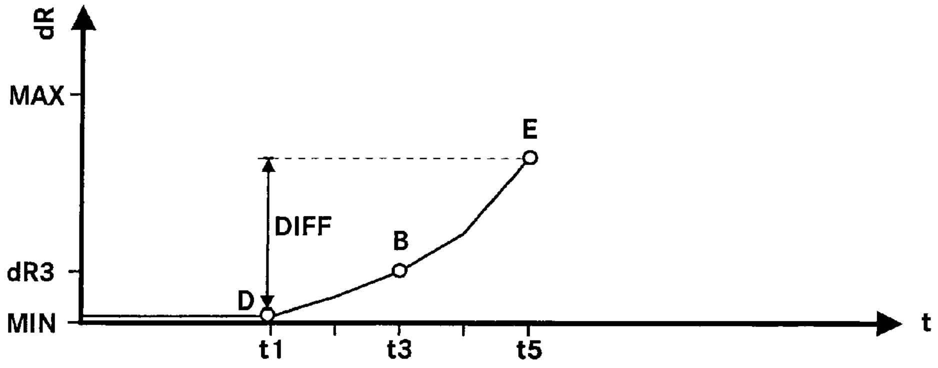

FIG. 4 consists of the partial FIGS. 4A and 4B. In addition, for the normal operation over time FIG. 4A shows the pressure curve of the rail pressure-actual value pCR(IST) and the rail pressure-desired value pCR(SW), and FIG. 4B shows the resulting system deviation dR. At time t1 the rail pressure-actual value PCR(IST) is equivalent to the rail pressure-desired value pCR(SW), corresponding to point A. The following observation assumes that the rail pressure-desired value pCR(SW) remains unchanged for the period of observation. At time t1 the system deviation is zero, corresponding to point D of FIG. 4B. After time t1, the rail pressure-actual value pCR(IST) begins to decrease. The cause is the defective rail pressure sensor 10. At time t3 there is already a system deviation dR3 at point B. At time t5 the defect is detected at point C. The result of the two curves in FIG. 4A is for the measurement period dt in FIG. 4B a system deviation dR in conformity with the curve with points D, B and E.

Figure 5:
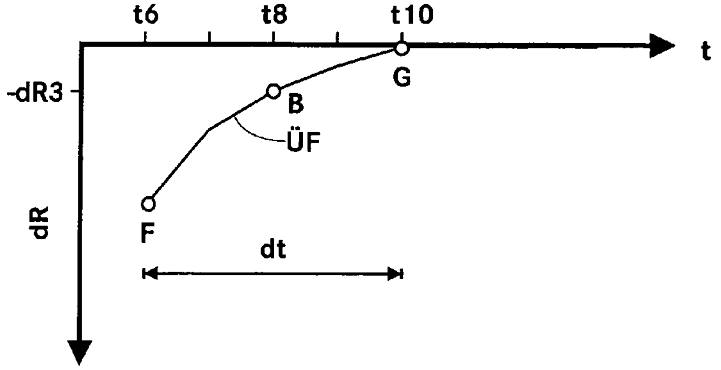
FIG. 5 is a timing diagram which depicts a transition function in accordance with an embodiment of the present invention.

The process, according to the control circuit in FIG. 2, continues as follows. Upon detection of the defective rail pressure sensor at time t5, the transition function ÜF is activated. This is illustrated in FIG. 5. The transition function ÜF corresponds to the negated system deviations dR. Starting from time t6, this is specified to the rail pressure regulator 13 for the same period of time as the measurement period dt, curves F and G. For example, the system deviation dR3, measured at time t3 at point B, is specified as dR3 at time t8. Starting from time t10, the transition function ÜF is deactivated in that the second switch 15 changes its switch position. Instead of the measurement period dt, a specifiable number of system deviations can also be used.

When the control circuit according to FIG. 3 is used, the process proceeds as follows. Upon detection of the defective rail pressure sensor at time t5, the system deviation at time t5, equivalent to the value of point E, is subtracted from the system deviation at time t1, equivalent to the value of point D. This difference DIFF is depicted in FIG. 4B. The transition function ÜF corresponds to the negated difference DIFF. This is fed as the step function to the DT1 block 19. The correcting volumetric flow V(KORR) is calculated by means of the DT1 block. Following passage of a specified time span or upon dropping below a threshold value, the DT1 block 19 is switched off by returning the switch 20 from the switch position, indicated by the dashed line, into the switch position, indicated by the continuous line.

Both methods offer the advantage that impermissible changes in the rail pressure due to a defective rail pressure sensor can be significantly decreased. The rail pressure changes in the case of a defective sensor because the high pressure control circuit continues to process the defective sensor signal until detection of the sensor defect and calculates from that the actuating signal for the suction throttle.

Figure 6:
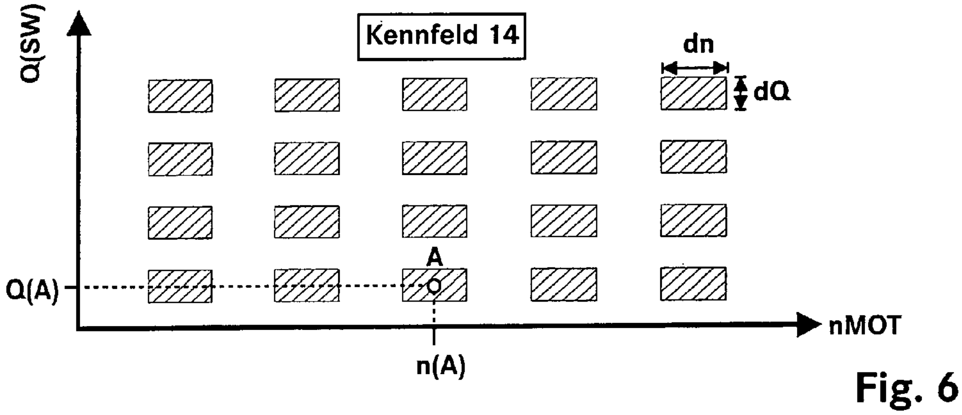
FIG. 6 is a characteristic diagram to determine leakage-volumetric flow in accordance with an embodiment of the present invention.
Figure 7:
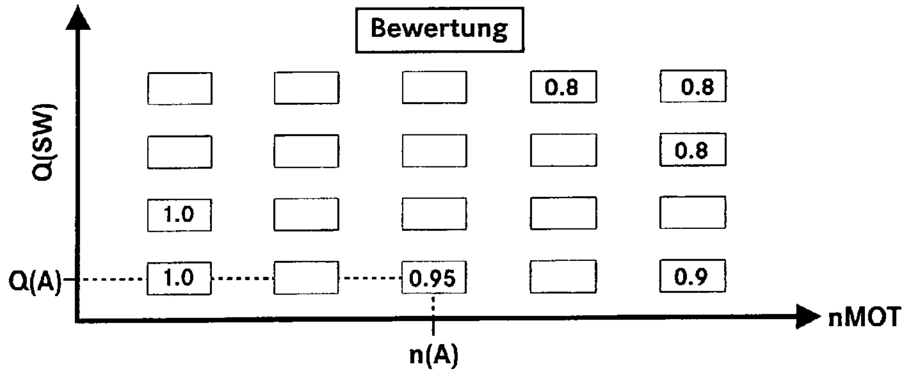
FIG. 7 is a loading characteristic diagram in accordance with an embodiment of the present invention.

FIG. 6 depicts a characteristic diagram 14 for determining the leakage-volumetric flow V(LKG). The engine speed nMOT is plotted on the abscissa. A desired rate of injection Q(SW) is plotted as the second input on the ordinate. The Z axis corresponds to the leakage-volumetric flow V(LKG). A specifiable operating area is assigned to each supporting point in this characteristic diagram. The operating areas are shaded in FIG. 6. One such operating area is defined by the variables dn and dQ. Typical values are, for example, 100 revolutions and 50 cubic millimeters per stroke. In FIG. 6 a supporting point A is sketched in as an example. This supporting point A is derived from the two input values—n (A) equals 3,000 revolutions per minute and Q(A) equals 40 cubic millimeters per stroke. A leakage-volumetric flow V(LKG) of, e.g., 7.2 liters per minute is assigned as the Z value to the supporting point A. Then the leakage-volumetric flow V(LKG), determined by means of the characteristic diagram 14, is weighted by means of a loading characteristic diagram, which is shown in FIG. 7. For the previous example, the result for the supporting point A, for example, is a loading factor of 0.95. Thus, in the end the leakage-volumetric flow V(LKG) is calculated at 6.84 liters per minute.

The Z values of the characteristic diagram 14 are determined in normal operation only when the common rail injection system is in a steady state, for example at operating point n(A) and Q(A). In this respect the regulator-volumetric flow VR or the filtered value is assigned to the corresponding operating area of the characteristic diagram 14 and stored as the Z value. The stored values represent a measure for the leakage of the common rail injection system. To calculate the Z values of the characteristic diagram 14, the integrating content of the rail pressure regulator 13 can be used, instead of the regulator-volumetric flow VR. It is clear that the Z values can already be permanently applied even upon delivery of the internal combustion engine. The Z values can be corrected by means of the loading characteristic diagram of FIG. 7. Thus, an inadmissibly high increase or decrease in the rail pressure following the failure of the rail pressure sensor, caused by too large or too small stored values of the characteristic diagram 14, can be effectively prevented.

Figure 8:
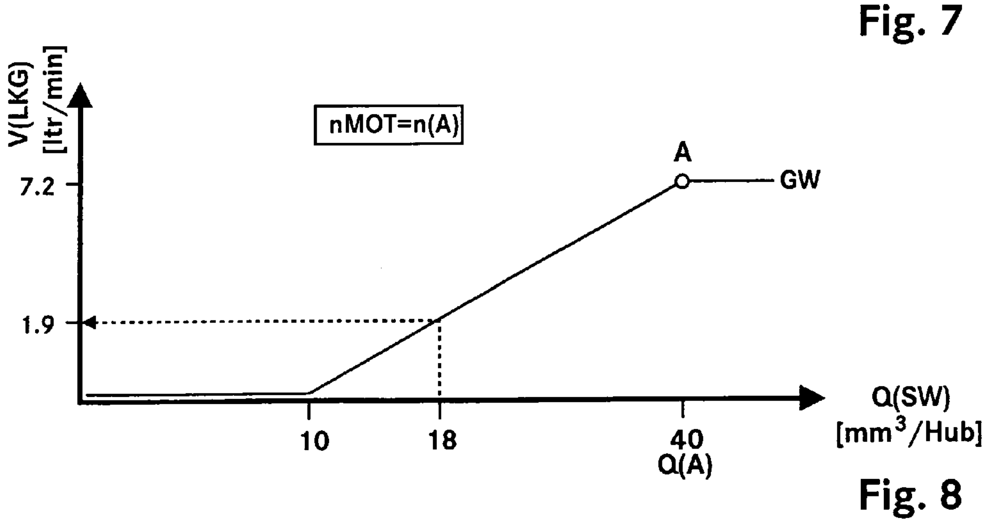
FIG. 8 is a diagram illustrating implementation of an upper flow limit in accordance with an embodiment of the present invention.

The characteristic diagram 14, shown in FIG. 6, has 5 times 4 supporting points. The advantage of this lies in a good overview and that fewer memory locations are required. The problem here lies in the circumstance that smaller values of the desired rate of injection Q(SW) below Q(A) cannot be represented. The desired rate of injection Q(A) is equivalent, for example, to a value of 40 cubic millimeters per stroke. If at this stage the speed regulator calculates a smaller value of the desired rate of injection Q(SW), for example, 18 cubic millimeters per stroke, then the supporting point Q(A) is used in the characteristic diagram 14. This too large value of the characteristic diagram 14 leads to an increase in the rail pressure during the emergency operation and thus to higher stress on the crankshaft. When using a characteristic diagram 14 with few supporting points, this problem can be remedied to some degree by introducing a limit line. In the area of the desired rate of injection values that are smaller than the smallest desired rate of injection values in the stationary state, the leakage-volumetric flow V(LKG) of the characteristic diagram 14 is decreased linearly by means of the limit line. Such a limit line GW is depicted in FIG. 8.

The desired rate of injection Q(SW) is plotted on the abscissa. The leakage-volumetric flow V(LKG) is plotted as the output on the ordinate. The limit line GW applies to a stationary engine speed, for example, for the supporting point A from FIG. 6, where n(A) equals 3,000 revolutions per minute. A leakage-volumetric flow of 7.2 liters per minutes is equivalent to a value Q(A) of 40 cubic millimeters per stroke. A desired rate of injection Q(SW) of 18 cubic millimeters per stroke, calculated by the speed regulator, works out to a corresponding leakage-volumetric flow of 1.9 liters per minute. Thus, the leakage-volumetric flow V(LKG), calculated by means of the characteristic diagram 14, can be corrected by means of the limit line GW when the desired rate of injection Q(SW) drops to smaller values. In this manner the increase in the rail pressure is limited when the rail pressure sensor fails. Hence, a more stable working point develops faster.

Figure 9:
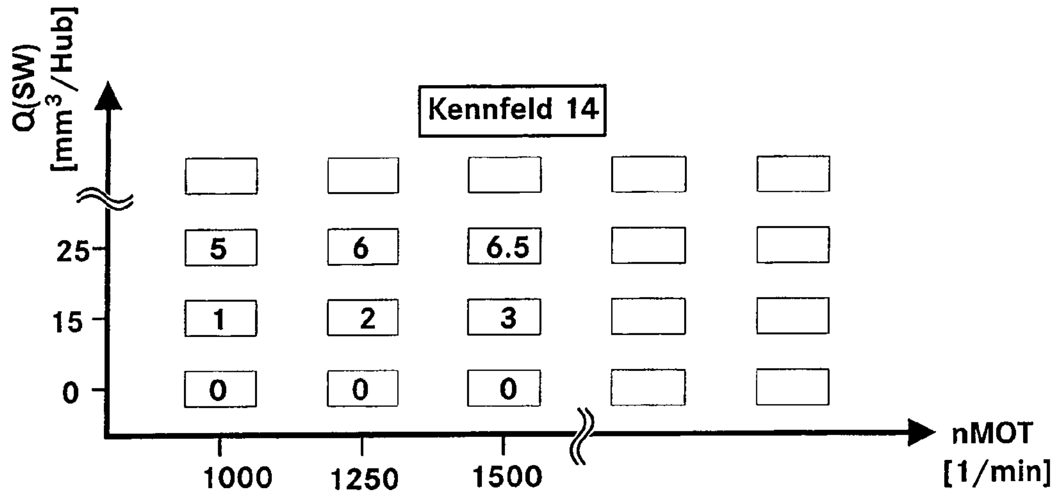
FIG. 9 is a characteristic diagram for determining leakage-volumetric flow in accordance with an embodiment of the present invention.

To prevent an impermissible increase in the rail pressure during emergency operation, the characteristic diagram 14 can also exhibit more supporting points. Should the rail pressure increase following the failure of the rail pressure sensor, the engine speed also increases. As a secondary reaction, the speed regulator reduces the desired rate of injection Q(SW). Hence, the leakage-volumetric flow V(LKG) is determined from the characteristic diagram 14 for ever decreasing desired rate of injection values Q(SW). An increase in the rail pressure during emergency operation can be effectively prevented, when the characteristic diagram 14 in the area of the desired rate of injection values, which are smaller than the smallest desired rate of injection values in the stationary state, is allocated small leakage-volumetric flows (Z values), ideally the value zero liters per minute. The rail pressure is prevented from increasing too fast, since the desired volumetric flow V(SOLL) is decreased as the rail pressure increases. In particular, in the light load area of the internal combustion engine, the increase in the rail pressure is limited early. FIG. 9 shows a section of such a designed characteristic diagram 14. In operation smaller leakage-volumetric flows (Z values) are assigned in conformity with the smaller desired rate of injection values Q(SW). Then the leakage-volumetric flow V(LKG), calculated herewith, is weighted by means of the loading characteristic diagram of FIG. 7.

Figure 10:
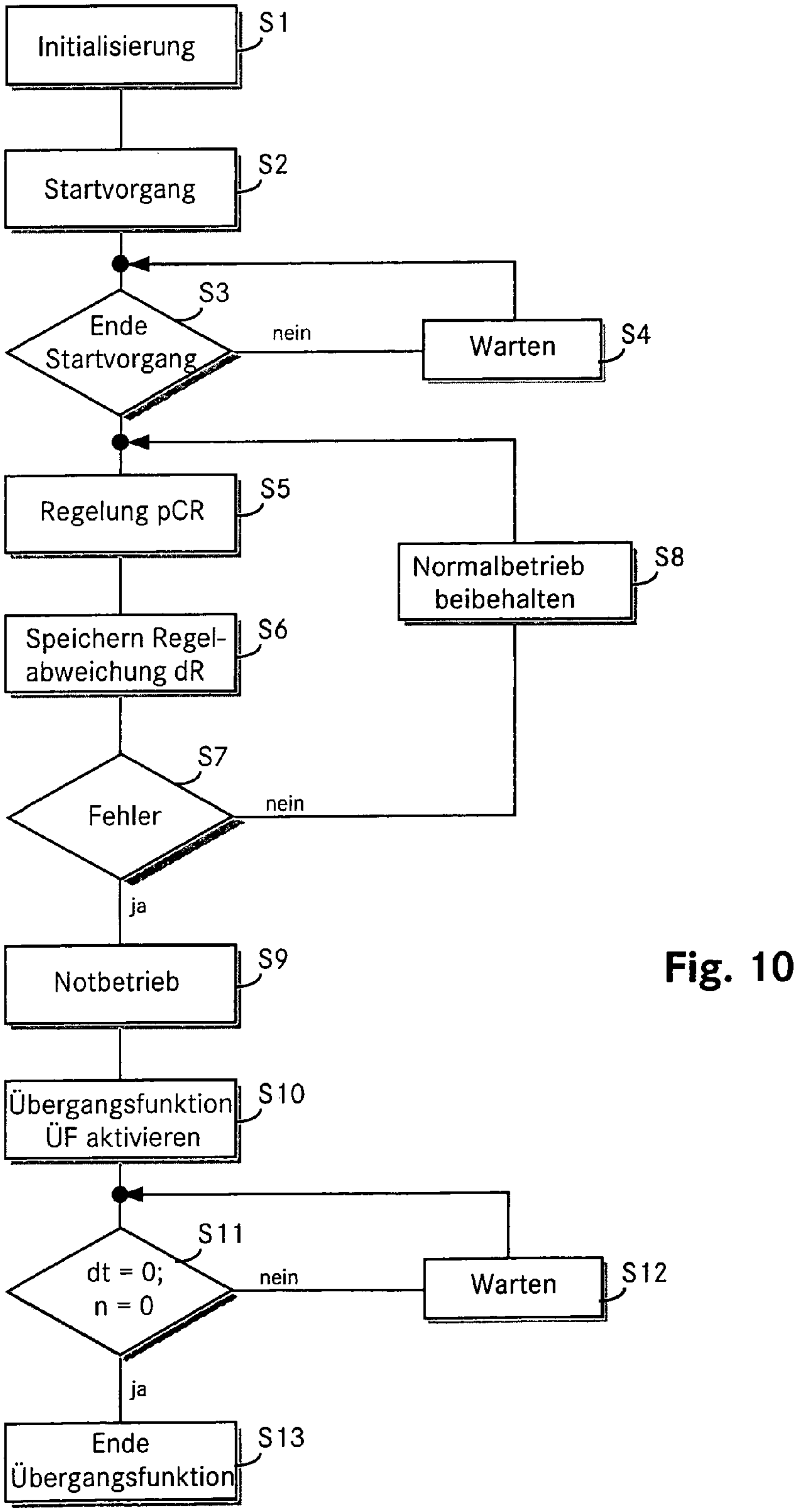
FIG. 10 is a program flowchart illustrating a common rail injection system control in accordance with an embodiment of the present invention.

FIG. 10 shows a program flowchart of the process. It begins at step S1 after initialization of the electronic device controller. At S2 the start operation for the internal combustion engine is activated. Then it is checked whether the start operation has ended. In practice the start operation has ended when the rail pressure-actual value pCR(IST) exceeds a limit value (regulator release pressure); and/or the engine speed nMOT exceeds a limit value (regulator release speed). If the start operation has not ended yet, the program cycles through the wait loop at S4. After the start operation has ended, the control of the rail pressure pCR is activated at S5. Then the system deviation dR over time is logged and stored at S6. Thus, the system deviations dR of a measurement period dt or a specifiable number of values can be selected hereby. At S7 it is checked whether the values, delivered by the rail pressure sensor, are error-free. If the rail pressure sensor is flawless, the normal operation is maintained—step S8, and the program flowchart continues at S5. If the test at S7 shows that the signals of the rail pressure sensor are defective, the emergency operation and the transition function ÜF are activated—step S9 and S10. The stored system deviation is specified inversely by means of the transition function ÜF to the rail pressure sensor; or a correcting volumetric flow is determined from the difference between two system deviations. Then it is checked at S11 whether the measurement period dt has expired. As an alternative, instead of the time (dt), the query of a number (n) of system deviations can be carried out.

If the query is negative at S11, the program cycles through a wait loop at step S12. If the test results at S11 are positive, the transition function is ended—step 13. During an emergency operation, the rail pressure is determined indirectly by the speed regulator by means of the characteristic diagram 14. As another measure, the operator of the internal combustion engine is informed about the emergency operation, for example, by means of a corresponding warning light and a diagnostic entry.

What is claimed is:

1. A method for controlling an internal combustion engine with a common rail injection system, comprising the acts of:

regulating a rail pressure during a normal operation;

determining whether a rail pressure sensor is defective;

switching, upon determining the rail pressure sensor is defective, from normal operation to an emergency operation, wherein the switching from the normal operation to the emergency operation is controlled in accordance with a transition function;

calculating system deviations during normal operation from a variance comparison of a rail pressure-actual value with a rail pressure-desired value; and determining the transition function from at least one of the system deviations.

2. The method of claim 1, wherein the transition function is determined from one of the system deviations of a measurement period and a predetermined number of system deviations.

3. The method of claim 2, wherein the transition function corresponds to the calculated system deviations with opposite sign.

4. The method of claim 3, further comprising the act of:

when switching from normal operation to emergency operation, calculating a regulator volumetric flow as a function of the transition function.

5. The method of claim 4, wherein the transition function ends upon completion of one of the measurement period and the predetermined number of system deviations.

6. The method of claim 2, wherein the transition function is determined from a difference between a first system deviation and a second system deviation.

7. The method of claim 6, wherein the transition function corresponds to the calculated system deviations with opposite sign.

8. The method of claim 7, further comprising the act of:

when switching from normal operation to emergency operation, calculating a regulator volumetric flow as a function of the transition function.

9. The method of claim 8, wherein the transition function ends upon completion of one of the measurement period and the predetermined number of system deviations.

10. The method of claim 3, further comprising the act of:

calculating, when switching from normal operation to emergency operation, a desired volumetric flow as a function of a regulator volumetric flow and a consumption-volumetric flow; and regulating rail pressure as a function of the desired volumetric flow.

11. The method of claim 6, further comprising the act of:

calculating, when switching from normal operation to emergency operation, a desired volumetric flow as a function of a regulator volumetric flow and a consumption-volumetric flow; and regulating rail pressure as a function of the desired volumetric flow.

12. The method of claim 11, wherein, in the act of calculating the desired volumetric flow, a leakage-volumetric flow, determined from a characteristic diagram, is also considered in calculating the desired volumetric flow.

13. The method of claim 10, wherein, when the transition function has ended, the desired volumetric flow is calculated as a function of the consumption-volumetric flow and a leakage-volumetric flow.

14. The method of claim 11, wherein, when the transition function has ended, the desired volumetric flow is calculated from the consumption-volumetric flow and the leakage-volumetric flow.

15. The method of claim 10, wherein the consumption-volumetric flow is calculated as a function of an engine speed and a desired rate of injection.

16. The method of claim 11, wherein the consumption-volumetric flow is calculated as a function of an engine speed and a desired rate of injection.

17. The method of claim 13, wherein the values of the leakage-volumetric flow in the characteristic diagram are determined in normal operation, and the value of the regulator volumetric flow is set as corresponding to the leakage-volumetric flow when operating in a steady state.

18. The method of claim 14, wherein the values of the leakage-volumetric flow in the characteristic diagram are determined in normal operation, and the value of the regulator volumetric flow is set as corresponding to the leakage-volumetric flow when operating in a steady state.

19. The method of claim 17, wherein the regulator-volumetric flow value is filtered.

20. The method of claim 13, wherein the regulator-volumetric flow value is filtered.

21. The method of claim 13, wherein the values of the leakage-volumetric flow in the characteristic diagram are determined in normal operation, and an integrating content of the rail pressure regulator is set as corresponding to the leakage-volumetric flow when operating in a steady state.

22. The method of claim 14, wherein the values of the leakage-volumetric flow in the characteristic diagram are determined in normal operation, and an integrating content of the rail pressure regulator is set as corresponding to the leakage-volumetric flow when operating in a steady state.

23. The method of claim 15, wherein the leakage-volumetric flow is corrected to smaller values defined by limit lines as the desired rate of injection decreases.

24. The method of claim 16, wherein the leakage-volumetric flow is corrected to smaller values defined by limit lines as the desired rate of injection decreases.

25. The method of claim 23, wherein the leakage-volumetric flow is weighted by a loading characteristic diagram.

26. The method of claim 24, wherein the leakage-volumetric flow is weighted by a loading characteristic diagram.

27. A system for controlling an internal combustion engine with a common rail injection system, comprising:

means for regulating a rail pressure during a normal operation;

means for determining whether a rail pressure sensor is defective;

means for switching, upon determining the rail pressure sensor is defective, from normal operation to an emergency operation, wherein the switching from the normal operation to the emergency operation is controlled in accordance with a transition function;

means for calculating system deviations during normal operation from a variance comparison of a rail pressure-actual value with a rail pressure-desired value; and means for determining the transition function from at least one of the system deviations.

28. A system for controlling an internal combustion engine with a common rail injection system, comprising:

a rail pressure regulator;

a rail pressure sensor; and a controller, the controller controlling the rail pressure regulator to control rail pressure in at least a normal operation and an emergency operation, wherein upon a determination that the rail pressure sensor is defective, the controller switches rail pressure control from normal operation to emergency operation in accordance with a transition functions calculating system deviations during normal operation from a variance comparison of a rail pressure-actual value with a rail pressure-desired value; and determining the transition function from at least one of the system deviations.

29. The system of claim 28, wherein the controller determines whether the rail pressure sensor is defective.

* * * * *